(12) United States Patent
Erhel et al.

(10) Patent No.: US 11,577,840 B2
(45) Date of Patent: Feb. 14, 2023

(54) AIRCRAFT DIVAN

(71) Applicant: BOMBARDIER INC., Dorval (CA)

(72) Inventors: Philippe Erhel, Montréal (CA); Adrian Goring, Ville Saint-Laurent (CA)

(73) Assignee: BOMBARDIER INC.

( * ) Notice: Subject to any disclaimer, the term of this patent is extended or adjusted under 35 U.S.C. 154(b) by 164 days.

(21) Appl. No.: 17/022,723

(22) Filed: Sep. 16, 2020

(65) Prior Publication Data
US 2021/0078710 A1 Mar. 18, 2021

Related U.S. Application Data

(60) Provisional application No. 62/901,296, filed on Sep. 17, 2019.

(51) Int. Cl.
*B64D 11/06* (2006.01)

(52) U.S. Cl.
CPC ...... *B64D 11/0641* (2014.12); *B64D 11/0601* (2014.12); *B64D 11/0604* (2014.12); *B64D 11/0642* (2014.12)

(58) Field of Classification Search
CPC . B64D 11/0604; B64D 11/0605; A47C 19/22; A47C 17/34; A47C 17/37; A47C 17/04
See application file for complete search history.

(56) References Cited

U.S. PATENT DOCUMENTS

| | | | |
|---|---|---|---|
| 5,954,401 A | 9/1999 | Koch et al. | |
| 7,419,214 B2 | 9/2008 | Plant | |
| 9,604,724 B2 | 3/2017 | Savard et al. | |
| 2006/0097553 A1 | 5/2006 | Spurlock et al. | |
| 2009/0058162 A1* | 3/2009 | Boes | B60N 2/888 297/410 |
| 2016/0325868 A1 | 11/2016 | Erhel | |

FOREIGN PATENT DOCUMENTS

| | | | |
|---|---|---|---|
| EP | 2 275 345 | * | 1/2011 |
| EP | 3604133 | | 2/2020 |
| GB | 2438162 | | 11/2007 |
| WO | 2008/122761 | * | 10/2008 |
| WO | 2008122761 | | 10/2008 |
| WO | 2015097630 | | 7/2015 |

\* cited by examiner

*Primary Examiner* — Richard Green
*Assistant Examiner* — Ashesh Dangol
(74) *Attorney, Agent, or Firm* — Norton Rose Fulbright Canada

(57) ABSTRACT

An aircraft is disclosed with an aircraft divan that comprises a back rest, an upright side rest extending from the back rest and forming a side of the aircraft divan, and a seat rest having a first seat section connected to the back rest and a second seat section displaceable translationally relative to the first seat section between a first position and a second position, a gap defined between the first seat section and the second seat section in the first position to receive therein legs of a seated occupant between the first and second seat sections, and the first and second seat sections being adjacent one another to close the gap and form an elongated sitting surface in the second position. A method of adjusting such aircraft divan is also provided.

16 Claims, 2 Drawing Sheets

AIRCRAFT DIVAN

CROSS-REFERENCE TO RELATED APPLICATIONS

This application claims priority to U.S. provisional patent application 62/901,296 filed Sep. 17, 2019, the entire contents of which are incorporated by reference herein.

TECHNICAL FIELD

The application relates generally to aircraft furniture and, more particularly, to aircraft divans.

BACKGROUND

There exists various cabin layouts designed to optimize the relatively limited cabin space in an aircraft, especially in business aircrafts which have a narrower body than typically larger commercial aircrafts. Furniture such as seats, chairs, tables, and divans may be part of the cabin interior and located within the cabin in a manner to facilitate usability and operability of the cabin. Some safety or other regulatory requirements of aircrafts may be strict when relating to take-off and/or landing of the aircraft, for instance. These requirements may limit or prevent freedom of design in connection with cabin interior configurations, for instance seating configurations and locations, which may affect the comfort of occupants and/or limit the adaptability of the cabin space to the occupants' needs.

SUMMARY

There is disclosed an aircraft divan, comprising: a back rest; an upright side rest extending from the back rest and forming a side of the aircraft divan; and a seat rest having a first seat section connected to the back rest and a second seat section displaceable relative to the first seat section between a first position and a second position, a gap defined between the first seat section and the second seat section in the first position to receive therein legs of a seated occupant between the first and second seat sections, and the first and second seat sections being adjacent one another to close the gap and form an elongated sitting surface in the second position.

There is disclosed a method of adjusting an aircraft divan, comprising: displacing a second seat section of a seat rest of the aircraft divan away from a first seat section of the seat rest to form a gap between the first and second seat sections to receive therein legs of a seated occupant.

There is disclosed an aircraft comprising at least one aircraft divan according to the present disclosure.

DESCRIPTION OF THE DRAWINGS

Reference is now made to the accompanying figures in which.

DETAILED DESCRIPTION

Figure 1:
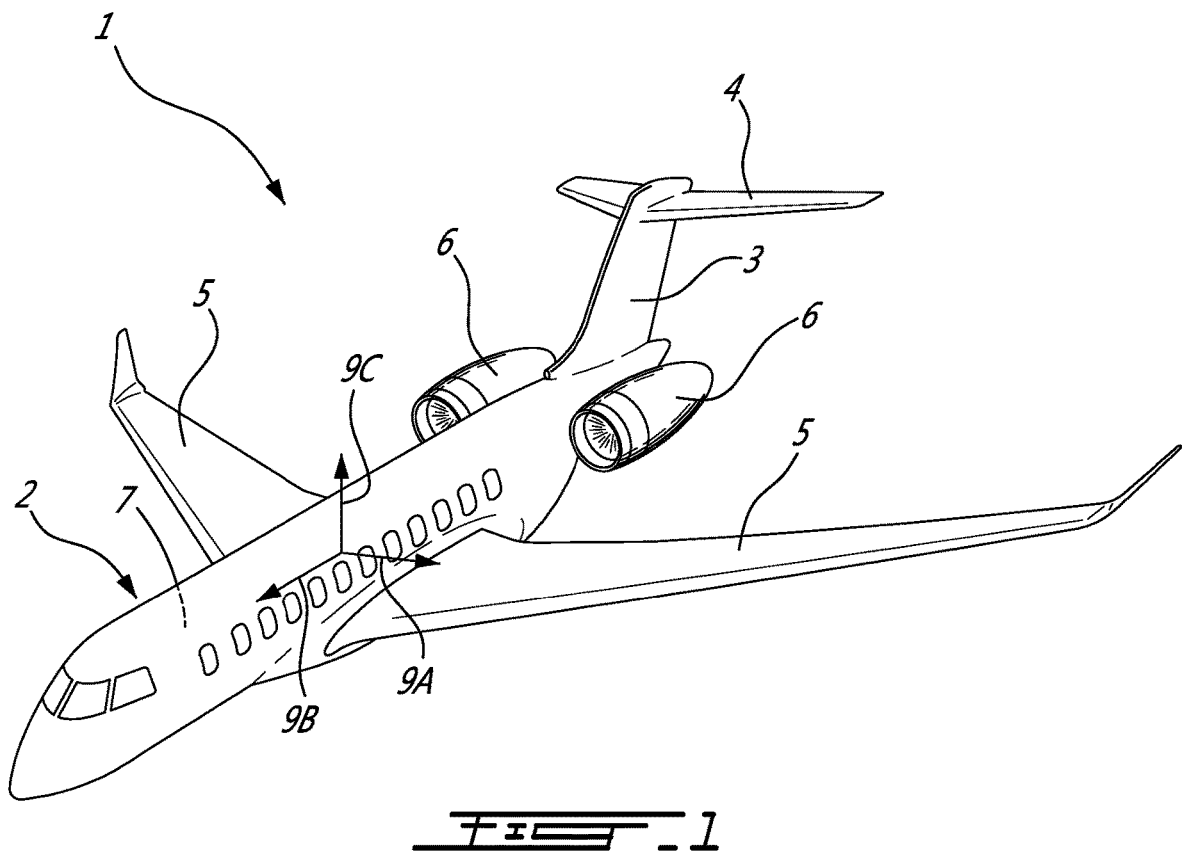
FIG. 1 is a schematic tridimensional view of an aircraft.

Referring to the drawings and more particularly to FIG. 1, an aircraft is shown at 1, and is generally described to illustrate some components for reference purposes in the present disclosure. The aircraft 1 has a fuselage 2 having a fore end and an aft end, with a cabin 7 generally located between the cockpit and a tail assembly. A tail assembly comprises a vertical stabilizer 3 with a rudder, and horizontal stabilizers 4 with elevators. The tail assembly has a fuselage-mounted tail, but other configurations may also be used for the aircraft 1, such as cruciform, T-tail, etc. Wings 5 project laterally from the fuselage 2. The aircraft 1 has engines 6 supported by the fuselage 2 in the depicted embodiment, although for other aircraft they can be mounted to the wings 5. The aircraft 1 is shown as a jet-engine aircraft, but may also be a propeller aircraft. It is also understood that the aircraft 1 can be a business aircraft, alternately it can be any other type of aircraft, including, but not limited to, a commercial aircraft or a military aircraft, manned or unmanned.

During flight, the aircraft 1 is free to rotate about three perpendicular axes of motion. More particularly, during flight the aircraft 1 is free to pitch about a transverse or lateral axis 9A which extends between the tips of the wings 5, to roll or bank about a longitudinal axis 9B extending from the nose to the tail assembly, and to yaw about a vertical axis 9C extending from a top of the aircraft 1 to its bottom. These axes 9A, 9B, 9C move with the aircraft 1 and define one of its frames of reference.

Figure 2:
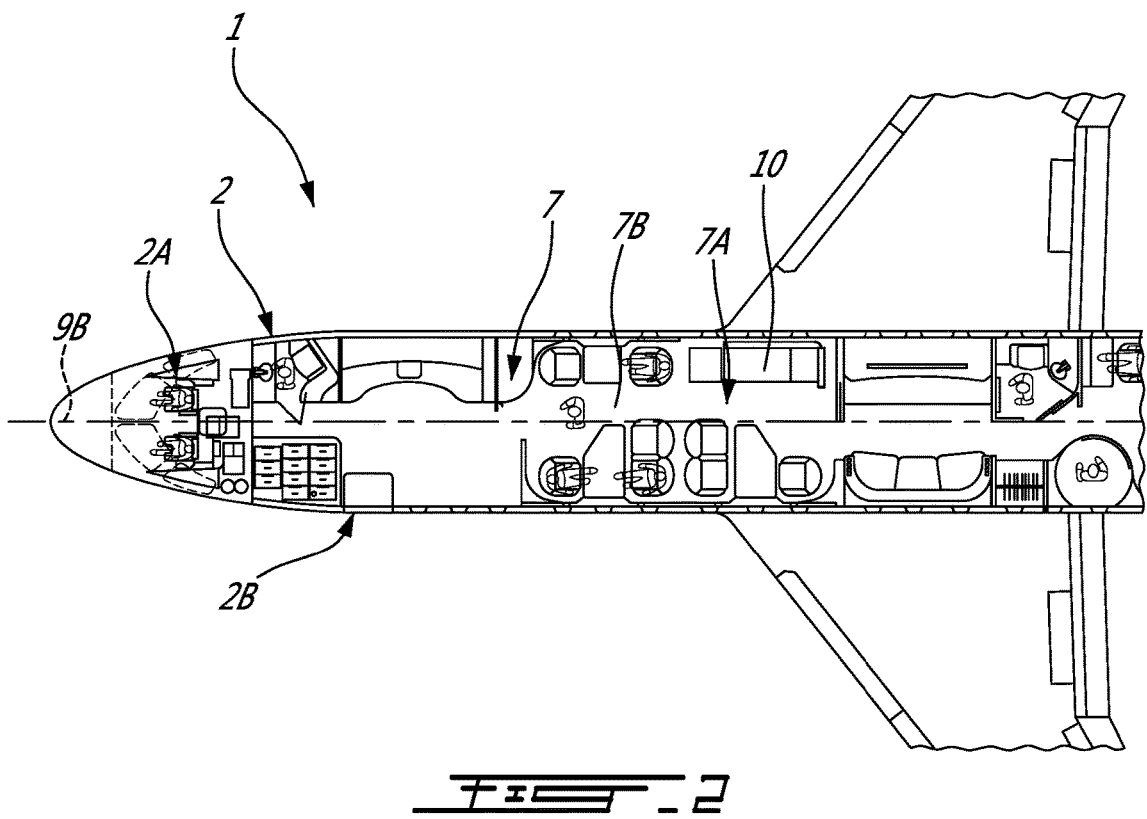
FIG. 2 is a top plan view showing a cabin of the aircraft of FIG. 1.

FIG. 2 shows an interior of the fuselage 2. FIG. 2 shows the cabin 7 which has a passenger section 7A for accommodating occupants of the aircraft 1. Other sections of the fuselage 2 shown in FIG. 2 include the cockpit 2A at a forward end of the aircraft 1. Passengers and crew enter the cabin 7 via an entrance 2B. The entrance 2B is formed by an opening in the fuselage 2 which is selectively closed by a door. The cabin 7 is delimited along its lower end by a cabin floor 7B. The cabin floor 7B extends throughout most of the length of the fuselage 2. The cabin floor 7B defines a surface which is visible to the passengers in the cabin 7, and along which the passengers walk throughout the cabin 7. The upper and side portions of the cabin 7 are also delimited by the inner surfaces of the fuselage 2.

The cabin 7 may include various types of furniture and amenities, sometimes referred to as "monuments". The passenger section 7A of smaller aircrafts such as business and/or private aircraft may be arranged to fit various occupants' needs. For instance, the cabin 7 may include chairs, tables, sofas, beds, or other types of furniture. Such furniture may need to be certified to respect aircraft regulatory requirements, which may impose requirements related to the orientation and/or positions of such furniture within the cabin 7, and how such furniture can be used at different moments of flight such as, take-off, landing and while taxiing.

Still referring to FIG. 2, one possible piece of furniture is an aircraft divan 10. The aircraft divan 10 allows for sitting more than one occupant of the aircraft 1, or an occupant in a lie-down position. However, and as will be described, the aircraft divan 10 may also provide a seat for a single occupant during some stages of flight, such as take-off and landing, where the position and orientation of the occupant must conform to regulatory requirements during these flight stages. During take-off and landing, for example, the occupant may be required to sit in an upright position, and may be required to face toward the front or rear of the aircraft 1. It may be desirable to vary the configuration of the aircraft divan 10 such as to allow using the aircraft divan 10 as a seat suitable for take-off and/or landing of the aircraft 1, but also to allow for selectively adjusting the aircraft divan 10 to provide an elongated sitting area to accommodate more than one occupant at the same time.

Figure 3:
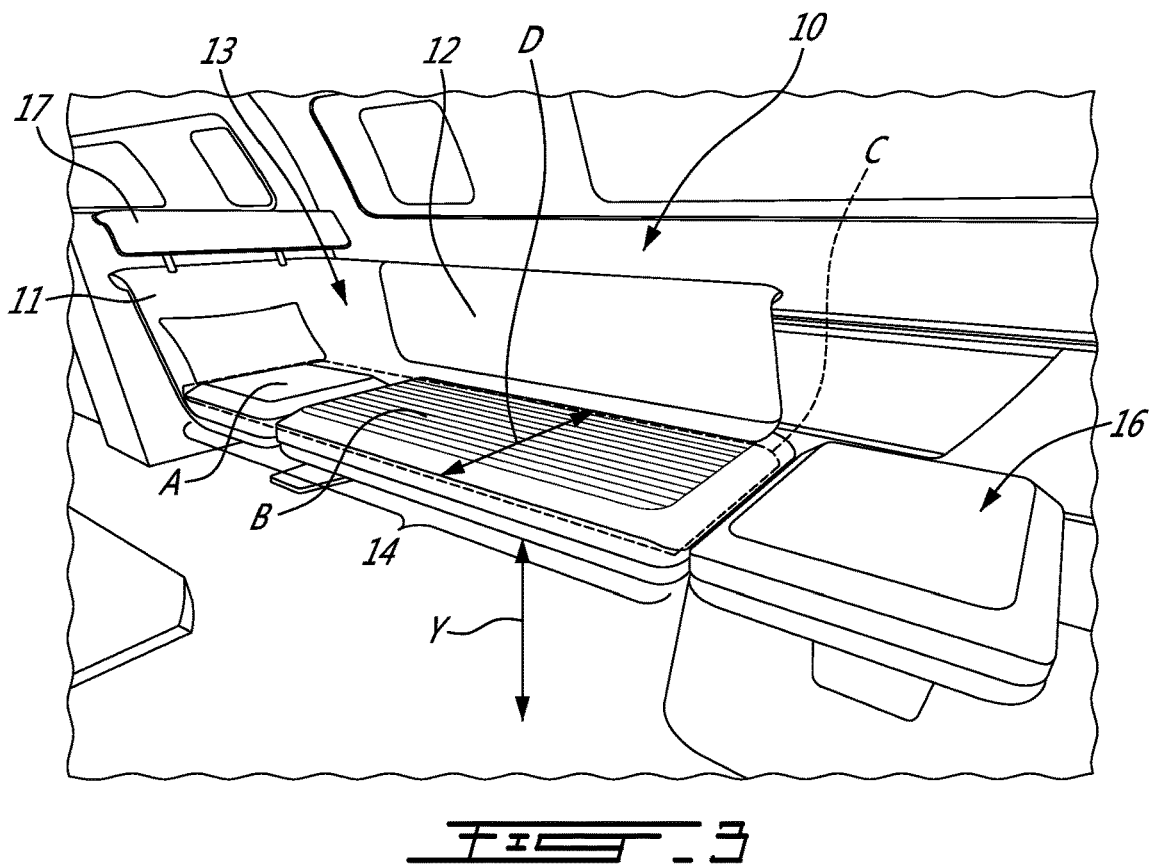
FIG. 3 is perspective view of an interior of the cabin of FIG. 2, showing an aircraft divan in a configuration.
Figure 4:
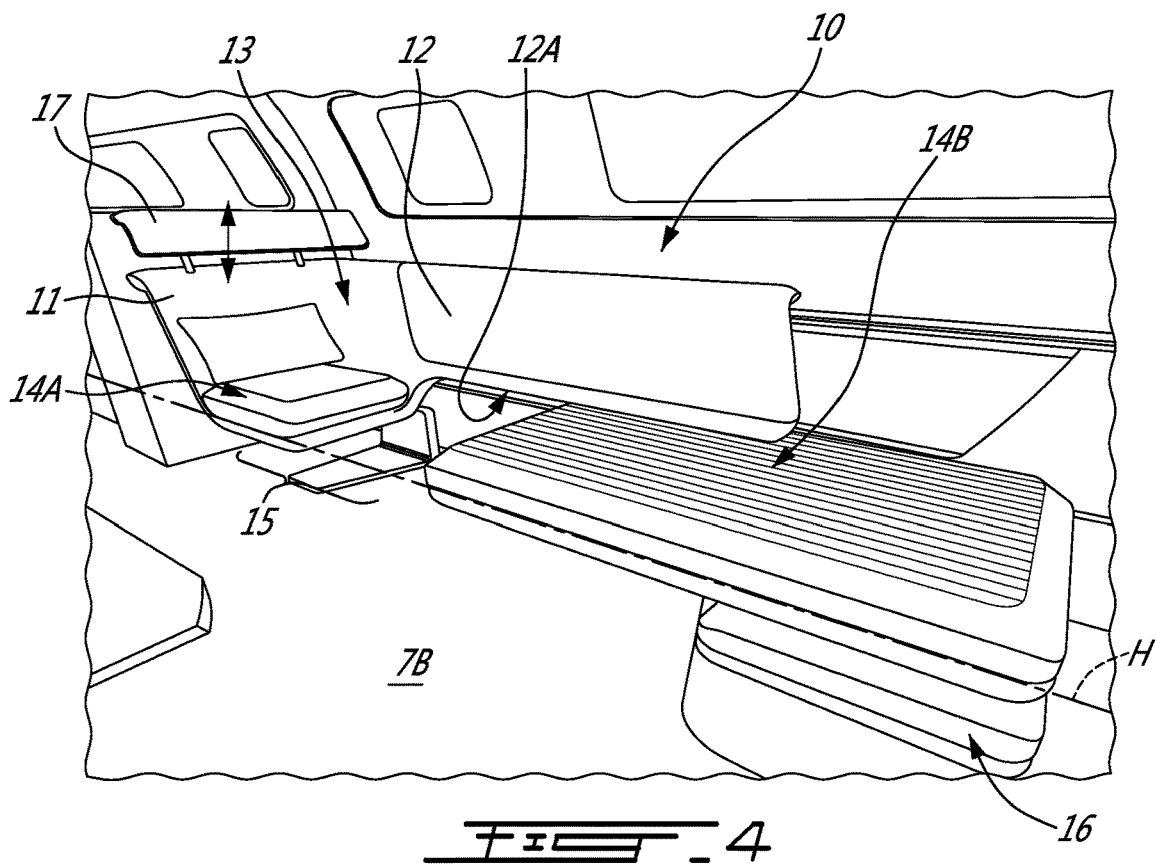
FIG. 4 is another perspective view of the aircraft divan of FIG. 3, the aircraft divan shown in a different configuration.

Referring to FIGS. 3 and 4, the aircraft divan 10 includes a back rest 11 and an upright side rest 12 extending from the back rest 11 and forming a side of the aircraft divan 10. In the depicted embodiment, the side rest 12 and the back rest 11 merge together into a bend 13 to form an integral upright surface. The side rest 12 and the back rest 11 are perpendicular to one another. It is understood that the back rest 11 and/or the side rest 12 being upright or substantially upright may also be slightly inclined/reclined for more comfort, for instance. In the depicted embodiment, the back rest 11 and the side rest 12 having a longitudinally-fixed position relative to the cabin 7. Despite having a longitudinally-fixed position, it will be appreciated that the back rest 11 and/or the side rest 12 may be reclinable and/or otherwise adjustable.

While the back rest 11 and the side rest 12 are shown as an integral part and as forming an integral upright or substantially upright surface of the aircraft divan 10 in FIGS. 3 and 4, the back rest 11 and the side rest 12 may be separate components connected together. As mentioned, the aircraft divan 10 may be configured to form a divan having an elongated sitting area. In this configuration, an occupant sitting on the aircraft divan 10 may sit such as to face in a direction transverse to the longitudinal axis 9A of the aircraft 1, and thus facing one of the sides of the fuselage 2. In such a sitting position, the occupant may use the side rest 12 as a back rest. This would be the case in embodiments of the aircraft 1 where the aircraft divan 10 is located along a side wall of the cabin 7, as shown in FIGS. 3 and 4, with the side rest 12 extending longitudinally along the side wall, i.e. in a fore-aft direction of the aircraft 1. In such an embodiment, the back rest 11 faces towards the front or the back of the aircraft 1.

The aircraft divan 10 comprises a seat rest 14. The seat rest 14 has a first seat section 14A and a second seat section 14B. The side rest 12 extends along the first and second seat sections 14A, 14B. In FIGS. 3 and 4, the first seat section 14A has a longitudinally-fixed position with respect to the cabin 7, it being understood that the first seat section 14A may also be adjustable in height and/or angularly adjustable (e.g. recline). This may allow for a greater comfort of the occupant and/or adapts the seat rest 14 to different occupant morphologies. The second seat section 14B is separate from the first seat section 14A. The second seat section 14B is displaceable translationally relative to the first seat section 14A between a first position and a second position. The second seat section 14B is displaceable along a single degree of freedom. The second seat section 14B is displaceable in FIGS. 3 and 4 in a direction being parallel to the longitudinal axis 9B of the aircraft 1. The second seat section 14B is displaceable in FIGS. 3 and 4 in a direction being parallel to the length of the side rest 12. The second seat section 14B is displaceable in FIGS. 3 and 4 in a single horizontal plane. The second seat section 14B thus linearly or slidingly displaces along a displacement axis. Although the displacement of the second seat section 14B is described herein as being linear, it may also displace in a combined linear and/or angular movement, sequentially or concurrently, in order to move towards and away from the first seat section 14A.

In an embodiment, the second seat section 14B may displace relative to the first seat section 14A and remain at a same height Y from the cabin floor 7B during the entire displacement range of the second seat section 14B.

The second seat section 14B is displaceable towards and away from the first seat section 14A in a linear movement. In FIGS. 3 and 4, the first seat section 14A remains immobile relative to the displaceable second seat section 14B. When the second seat section 14B is in the first position and spaced apart from the first seat section 14A, as shown in FIG. 4, a gap 15 is defined between the first seat section 14A and the second seat section 14B to receive legs of an occupant seated on the first seat section 14A with the side rest 12 extending on a right or left hand side of the seated occupant. In this first position of the second seat section 14B, the first seat section 14A and the back rest 11 collectively form a seat for the occupant having the legs positioned in the gap 15 between the first seat section 14A and the second seat section 14B. The gap 15 allows the occupant of the aircraft divan 15 to assume an upright, seated orientation in the seat collectively defined by the back rest 11 and the first seat section 14A. In the depicted embodiment where such a seat faces the forward or aft direction, the seated occupant will also face the forward or aft direction. The aircraft divan 10 may therefore satisfy regulatory requirements for passenger seating, while still being adjustable to form a full divan for the stages of flight where divan seating is permissible. In FIG. 4, the gap 15 is positioned between opposite longitudinal ends of the side rest 12.

In the second position of the second seat section 14B, after the second seat section 14B has been displaced towards the first seat section 14A, the first and second seat sections 14A, 14B are adjacent or proximate one another to close the gap 15, as shown in FIG. 3. In this second position of the second seat section 14B, the first and second seat sections 14A, 14B form an elongated sitting surface C. In other words, the elongated sitting surface may form a horizontal or flat elongated surface on which the occupant may lie down to sleep, for example. The elongated sitting surface may also be suitable to accommodate two or more occupants sitting side to side on the aircraft divan 10. The elongated sitting surface is longer than it is wide. In an embodiment, the elongated sitting surface formed by the first and second seat sections 14A, 14B is at least two times longer than a depth D of the second seat section 14B. The depth D is measured along a direction transverse to the longitudinal dimension of the second seat section 14B. The depth D and the longitudinal dimension define a visible sitting area of the second seat section 14B and part of the elongated sitting surface.

In FIGS. 3 and 4, the second seat section 14B is mounted to a structure of the aircraft 1 in a cantilever fashion. In other words, the second seat section 14B is free of support mounted on the cabin floor 7B underneath the second seat section 14B. In an alternate embodiment, said structure of the aircraft 1 may be a wall of the cabin 7 or a standalone wall extending from the cabin floor 7B. In an alternate embodiment, the second seat section 14B may have a support underneath thereof and contacting the cabin floor 7B while still allowing relative movement between the cabin floor 7B and the second seat section 14B.

In FIGS. 3 and 4, part of the second seat section 14B faces an underside 12A of the side rest 12 while the second seat section 14B is in one or both of the first and second positions. In the depicted embodiment, such part of the second seat section 14B is a part of a second sitting surface B defined by the second seat section 14B that faces an underside 12A of the side rest 12 while the second seat section 14B is in one or both of the first and second positions. The second sitting surface B may directly contact the underside 12A of the side rest 12. As seen in FIGS. 3 and 4, a part of the second seat section 14B faces the underside 12A of the side rest 12 during displacement of the second seat section 14B.

In an embodiment, where the aircraft divan 10 is disposed in the cabin 7 such that the side rest 12 extends longitudinally in a fore-aft direction of the aircraft 1, the second seat section 14B is displaceable in a direction being parallel to the longitudinal axis 9B of the aircraft 1. The first and second seat sections 14A, 14B define respectively a first sitting surface A and the second sitting surface B, with at least part of the first and second sitting surfaces A, B extending in a common horizontal or flat plane H. These first and second sitting surfaces A, B may remain in said common horizontal or flat plane H when the second seat section 14B is in a position away from the first seat section 14A (i.e. the second position), and when the second seat section 14B is adjacent the first seat section 14A and the gap 15 is closed (i.e. the first position). The first and second sitting surfaces A, B are both at the same height Y from the cabin floor 7B when the second seat section 14A is in both the first and second positions.

In an embodiment, the second seat section 14B is slidable along a track or rail, or other similar mechanism. In an embodiment, the track includes corresponding rail portions engaged together, the rail portions mounted respectively to the second seat section 14B and to a structure of the aircraft 1, such as a wall of the cabin 7 or other fixed structure, for instance.

In FIGS. 3 and 4, the aircraft divan 10 has a head rest 17, which may be adjustable in an upright height direction. The adjustable head rest 17 is connected to the back rest 11 and displaceable with respect to the back rest 11 between a first height position and a second height position. In an alternate embodiment, the aircraft divan 10 is free of a head rest 17.

In the embodiment shown in FIGS. 3 and 4, the aircraft divan 10 includes an ottoman 16. The ottoman 16 is separate from the first and second seat sections 14A. The ottoman 16 is a standalone part. The ottoman 16 is not physically connected to any one of the first and second seat sections 14A, 14B in the depicted embodiment. As shown in FIG. 3, the ottoman 16 adds to the elongated sitting surface when the second seat section 14B is adjacent the first seat section 14A in the second position, such that the overall sitting surface of the aircraft divan 10 is longer. In other words, the elongated sitting surface initially formed by the first and second seat sections 14A, 14B may also include the sitting surface defined by the ottoman 16 to form a longer elongated sitting surface. As shown in FIG. 3, the ottoman 16 is in a common horizontal plane H with the second seat section 14B in the second position. The ottoman 16 is spaced apart from one of the ends of the side rest 12, and is spaced apart from the back rest 11 by the first and second seat sections 14A, 14B.

The ottoman 16 is displaceable in a direction transverse to a translational displacement direction of the second seat section 14B. In FIGS. 3 and 4, the ottoman 16 displaces in an upright or substantially upright direction. The ottoman 16 is displaceable between an extended position and a collapsed position. The extended position is shown in FIG. 3, and corresponds to a position in which the ottoman 16 adds to the elongated sitting surface initially formed by the first and second seat sections 14A, 14B adjacent one another. The collapsed position is shown in FIG. 4, and corresponds to a position allowing the ottoman 16 to be disposed underneath the second seat section 14B when the second seat section 14B is in the first position. As such, when the ottoman 16 is in its collapsed position, the second seat section 14B overlies, partially or completely, the ottoman 16 when the second seat section 14B is in the first position.

Referring to FIGS. 3 and 4, there is also disclosed a method of adjusting the aircraft divan 10. The adjustment of the aircraft divan 10 may be made in many suitable manners, including, but not limited to, manually adjusting the aircraft divan 10 by selectively moving the second seat section 14B relative to the first seat section 14A, or by using actuators, such as electric and/or pneumatic actuators actuated by one or more controllers, remote or integrated into the aircraft divan 10. The method includes displacing the second seat section 14B away from the first seat section 14A of the seat rest 14 to form the gap 15 between the first and second seat sections 14A, 14B to receive therein the legs of a seated occupant. In embodiments where the ottoman 16 is present and displaceable, the ottoman 16 may be displaced between the extended position and the collapsed position transversally to a displacement direction of the second seat section 14B. Displacing the ottoman 16 to the extended position may include adding to the elongated sitting surface with the first and second seat sections 14A, 14B.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. An aircraft divan, comprising:
   a back rest;
   an upright side rest extending from the back rest and forming a side of the aircraft divan; and
   a seat rest having a first seat section connected to the back rest and a second seat section displaceable relative to the first seat section between a first position and a second position, a gap defined between the first seat section and the second seat section in the first position to receive therein legs of a seated occupant between the first and second seat sections, and the first and second seat sections being adjacent one another to close the gap and form an elongated sitting surface in the second position; and
   a separate displaceable ottoman adding to the elongated sitting surface, the second seat section, overlying at least partially the ottoman in the first position.

2. The aircraft divan of claim 1, wherein the ottoman is in a common horizontal plane with the second seat section in the second position.

3. The aircraft divan of claim 1, wherein the ottoman is displaceable in a direction transverse to a translational displacement direction of the second seat section.

4. The aircraft divan of claim 3, wherein the ottoman is displaceable between an extended position and a collapsed position, the ottoman adding to the elongated sitting surface in the extended position, and the ottoman in the collapsed position being disposed underneath the second seat section when the second seat section is in the first position.

5. The aircraft divan of claim 1, wherein the side rest and the back rest are connected along a continuous bend, the side rest and the back rest forming an integral upright surface.

6. The aircraft divan of claim 1, wherein the side rest extends along the first and second seat sections of the seat rest.

7. The aircraft divan of claim 1, wherein part of the second seat section faces an underside of the side rest while in at least one of the first and second positions.

8. The aircraft divan of claim 1, wherein the side rest extends between first and second longitudinal ends, the gap positioned between the first and second longitudinal ends of the side rest.

9. The aircraft divan of claim 1, wherein the first seat section defines a first sitting surface and the second seat section defines a second sitting surface, the first and second sitting surfaces being coplanar in both the first and second positions of the second seat section.

10. The aircraft divan of claim 1, wherein the elongated sitting surface is at least two times longer than a depth of the second seat section.

11. The aircraft divan of claim 1, further comprising an adjustable head rest connected to the back rest and displaceable with respect to the back rest between a first height position and a second height position.

12. An aircraft comprising the aircraft divan of claim 1, wherein the side rest extends longitudinally in a fore-aft direction of the aircraft and the back rest faces towards a front or a rear of the aircraft.

13. A method of adjusting an aircraft divan, comprising: displacing a second seat section of a seat rest of the aircraft divan away from a first seat section of the seat rest to form a gap between the first and second seat sections to receive therein legs of a seated occupant; and displacing an ottoman between an extended position and a collapsed position transversally to a displacement direction of the second seat section; wherein the step of displacing the second seat section away from the first seat section comprises moving the second seat section over the ottoman in the collapsed position.

14. The method of claim 13, comprising displacing the second seat section toward the first seat section to close the gap and form an elongated sitting surface.

15. The method of claim 14, wherein the step of displacing the ottoman to the extended position forms an addition to the elongated sitting surface.

16. The method of claim 5' wherein the step of displacing the second seat section comprises displacing the second seat section in a fore-aft direction of an aircraft.

* * * * *